US012358326B2

(12) United States Patent
Yoshida

(10) Patent No.: US 12,358,326 B2
(45) Date of Patent: Jul. 15, 2025

(54) PNEUMATIC TIRE

(71) Applicant: The Yokohama Rubber Co., LTD., Tokyo (JP)

(72) Inventor: Hiroyuki Yoshida, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 159 days.

(21) Appl. No.: 17/756,017

(22) PCT Filed: Nov. 16, 2020

(86) PCT No.: PCT/JP2020/042670
§ 371 (c)(1),
(2) Date: May 13, 2022

(87) PCT Pub. No.: WO2021/100669
PCT Pub. Date: May 27, 2021

(65) Prior Publication Data
US 2022/0388347 A1    Dec. 8, 2022

(30) Foreign Application Priority Data
Nov. 18, 2019    (JP) .................................. 2019-208314

(51) Int. Cl.
*B60C 11/13*    (2006.01)
*B60C 11/03*    (2006.01)
*B60C 11/12*    (2006.01)

(52) U.S. Cl.
CPC ... *B60C 11/1353* (2013.01); *B60C 2011/0346* (2013.01); *B60C 2011/1254* (2013.01); *B60C 2011/1361* (2013.01); *B60C 2200/14* (2013.01)

(58) Field of Classification Search
CPC ......... B60C 2011/1361; B60C 11/1353; B60C 11/1369
See application file for complete search history.

(56) References Cited

U.S. PATENT DOCUMENTS 3,727,661 A * 4/1973 Hoke ................... B60C 11/032
152/209.22
4,784,200 A * 11/1988 Fujiwara ................ B60C 11/01
152/902
(Continued)

FOREIGN PATENT DOCUMENTS

JP        03086603 A *  4/1991 .......... B60C 11/0311
JP     2005-119614 A     5/2005
(Continued)

OTHER PUBLICATIONS

English machine translation of JP03-086603 (Year: 1991).*

*Primary Examiner* — Robert C Dye
(74) *Attorney, Agent, or Firm* — Thorpe North & Western

(57) ABSTRACT

A pneumatic tire includes a plurality of main grooves and a land portion defined by the main grooves. Further, the main groove includes a rib-shaped protrusion portion protruding from a groove bottom of the main groove and extending in a tire width direction, and being coupled to a groove wall of the main groove at, at least, one end. Further, a maximum height $H1$ of the protrusion portion has a relationship $0.01 \leq H1/Hg \leq 0.20$ with respect to a groove depth $Hg$ of the main groove. Further, the maximum height $H1$ of the protrusion portion is in a range $H1 \leq 1.6$ mm.

13 Claims, 13 Drawing Sheets

(56) References Cited

U.S. PATENT DOCUMENTS

| | | | |
|---|---|---|---|
| 2015/0083306 A1* | 3/2015 | Colby | B60C 11/04 |
| | | | 156/96 |
| 2015/0273949 A1* | 10/2015 | Arai | B60C 11/1204 |
| | | | 152/209.18 |
| 2016/0121659 A1* | 5/2016 | Kageyama | B60C 11/11 |
| | | | 152/209.24 |
| 2016/0193887 A1* | 7/2016 | Ogane | B60C 11/0327 |
| | | | 152/209.21 |
| 2019/0100060 A1* | 4/2019 | Hokazono | B60C 11/1236 |

FOREIGN PATENT DOCUMENTS

| | | |
|---|---|---|
| JP | 2007-210568 A | 8/2007 |
| JP | 2008-239094 A | 10/2008 |
| JP | 2018-34698 A | 3/2013 |
| JP | 2015-48023 A | 3/2015 |
| JP | 2016-199154 A | 12/2016 |
| JP | 2019-107941 A | 7/2019 |
| JP | 2019-127105 A | 8/2019 |
| JP | 2019-182066 A | 10/2019 |

\* cited by examiner

| | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|
| COUPLING TO GROOVE WALL | NO | YES | YES | YES | YES | YES | YES | YES | YES | YES |
| W1 (mm) | 3.5 | 3.5 | 3.5 | 3.5 | 2.9 | 1.6 | 2.9 | 2.9 | 2.9 | 2.9 |
| T1 (mm) | 10.4 | 10.4 | 10.4 | 10.4 | 10.4 | 10.4 | 11.5 | 12.5 | 10.4 | 10.4 |
| H1 (mm) | 4.4 | 2.6 | 1.6 | 1.0 | 2.6 | 2.6 | 2.6 | 2.6 | 2.6 | 1.0 |
| W1/L1 | 0.34 | 0.34 | 0.34 | 0.34 | 0.28 | 0.15 | 0.25 | 0.23 | 0.28 | 0.28 |
| W1/P1 | - | 0.70 | 0.70 | 0.70 | 0.58 | 0.32 | 0.58 | 0.58 | 0.58 | 0.46 |
| θ1 (degrees) | 20 | 20 | 20 | 20 | 20 | 20 | 20 | 20 | 45 | 90 |
| L1/Wg | 0.70 | 0.70 | 0.70 | 0.70 | 0.70 | 0.70 | 0.78 | 0.84 | 0.74 | 0.63 |
| H1/Hg | 0.30 | 0.18 | 0.11 | 0.07 | 0.18 | 0.18 | 0.18 | 0.18 | 0.18 | 0.07 |
| OFF-ROAD PERFORMANCE | 100 | 100 | 102 | 102 | 105 | 105 | 105 | 105 | 106 | 108 |
| WEAR RESISTANCE PERFORMANCE | 100 | 105 | 104 | 103 | 105 | 105 | 106 | 107 | 105 | 105 |
| SCRATCH RESISTANCE PERFORMANCE | 100 | 110 | 110 | 105 | 105 | 104 | 107 | 107 | 108 | 108 |

FIG. 13

PNEUMATIC TIRE

TECHNICAL FIELD

The technology relates to a pneumatic tire and particularly relates to a pneumatic tire that can provide improved tire scratch resistance performance while enhancing tire off-road performance.

BACKGROUND ART

In the related art, for a known all-season tire that is mounted on a pickup truck and an SUV (Sport Utility Vehicle), there is a demand for increasing tire off-road performance. A technology described in Japan Unexamined Patent Publication No. 2005-119614 is a known pneumatic tire in the related art.

Meanwhile, in the above-mentioned all-season tire, there is a demand for improving tire scratch resistance performance by suppressing groove bottom cracks during off-road driving.

SUMMARY

The technology provides a pneumatic tire that can provide improved tire scratch resistance performance while enhancing tire off-road performance.

A pneumatic tire according to the technology is a pneumatic tire including a plurality of main grooves, and a land portion defined by the main grooves, each of the main grooves including a protrusion portion that protrudes from a groove bottom of the main groove and extends in a tire width direction, and that is coupled to a groove wall of the main groove at at least one end, the protrusion portion having a rib shape, and a maximum height H1 of the protrusion portion having a relationship $0.01 \leq H1/Hg \leq 0.20$ with respect to a groove depth Hg of the main groove.

In the pneumatic tire according to the technology, (1) since the rib-shaped protrusion portion extending in the tire width direction is arranged at the groove bottom of the main groove, there is an advantage that tire off-road performance is improved by the traction action of the protrusion portion when traveling on a mud road. Further, (2) since the protrusion portion is coupled to the groove wall of the main groove at, at least, one end, the protrusion portion is reinforced by the land portion. As a result, there is an advantage that occurrence of groove bottom cracks starting from the protrusion portion is suppressed, and tire scratch resistance is improved. Further, (3) the maximum height H1 of the protrusion portion is set very low, so that the groove volume of the main groove is ensured. In this way, there is an advantage that mud drainage during rolling of the tire is ensured and tire off-road performance is ensured, and also there is an advantage that occurrence of groove bottom cracks starting from the protrusion portion is suppressed.

BRIEF DESCRIPTION OF DRAWINGS

FIG. 13 is a table showing the results of performance tests of pneumatic tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Pneumatic Tire

Figure 1:
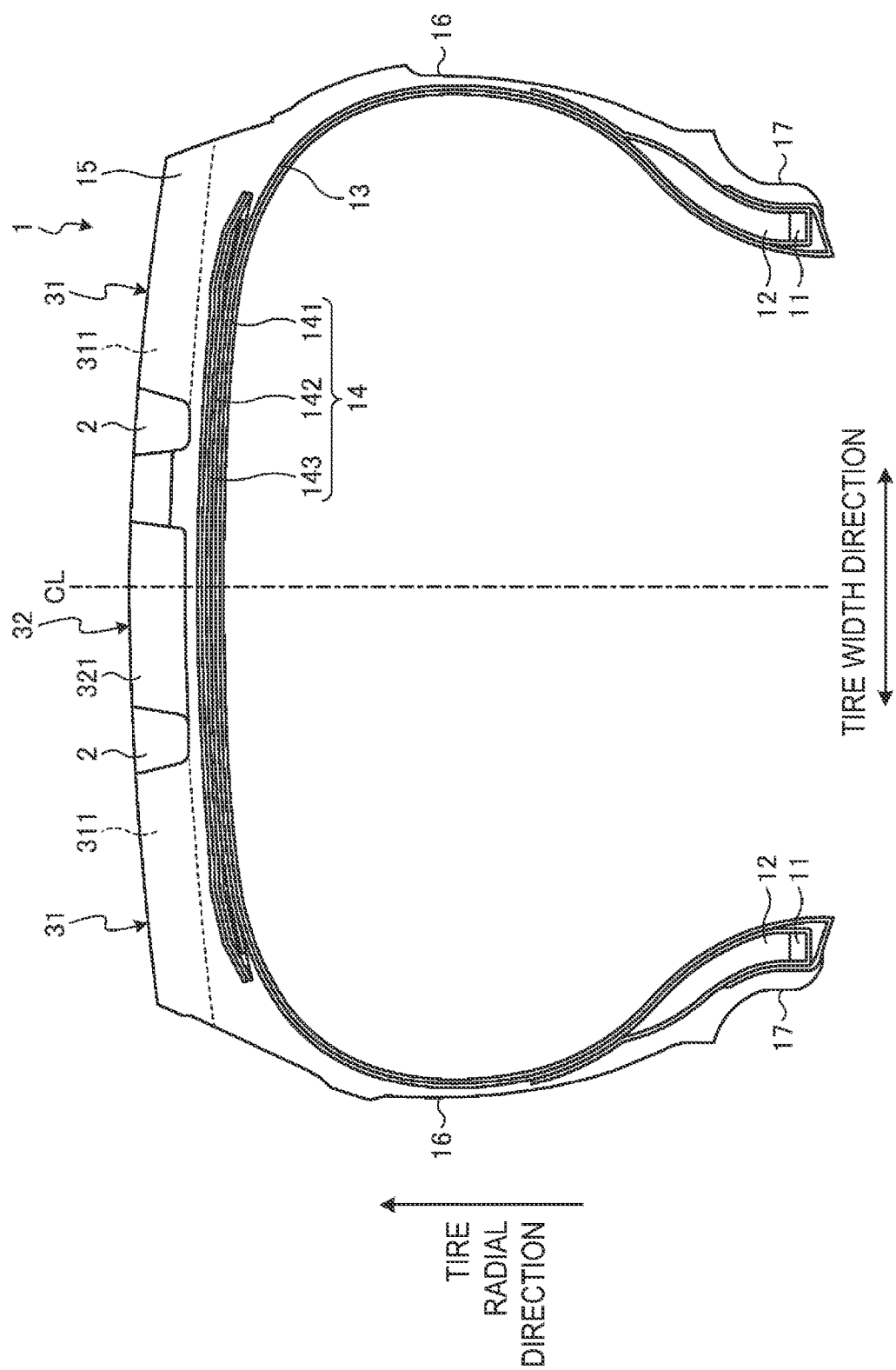
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. Further, the same drawing also illustrates a radial tire for a light truck as an example of a pneumatic tire.

In the same drawing, a cross-section in the tire meridian direction is defined as a cross-section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA (The Japan Automobile Tyre Manufacturers Association, Inc.). Additionally, a tire width direction is defined as a direction parallel to the tire rotation axis, and the tire radial direction is defined as a direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are respectively disposed on an outer circumference of the pair of bead cores 11, 11 in the tire radial direction and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 of left and right, and constitutes the backbone of the tire. Additionally, both end portions of the carcass layer 13 are wound and turned back toward an outer side in the tire width direction to wrap the bead cores 11 and the bead fillers 12, and are fixed. Moreover, the carcass ply of the carcass layer 13 is made by covering a plurality of carcass cords made of steel or an organic fiber material (for example, aramid, nylon, polyester, rayon, or the like) with a coating rubber and performing a rolling process on the carcass cords, and has a cord angle (defined as an inclination angle in a longitudinal direction of the carcass cords with respect to a tire circumferential direction) of 80 degrees or more and 100 degrees or less.

The belt layer 14 is a multilayer structure including a plurality of belt plies 141 to 143 and is disposed around the periphery of the carcass layer 13. The belt plies 141 to 143 include a pair of cross belts 141 and 142 and a belt cover 143.

The pair of cross belts 141, 142 are made by covering a plurality of belt cords made of steel or an organic fiber material with a coating rubber and performing a rolling process on the belt cords, and each have a cord angle with an absolute value of 15 degrees or more and 55 degrees or less. Further, the pair of cross belts 141, 142 have cord angles (defined as inclination angles in a longitudinal direction of the belt cords with respect to the tire circumferential direction) of opposite signs relative to each other and are layered such that the longitudinal directions of the belt cords intersect each other (so-called crossply structure). Furthermore, the pair of cross belts 141, 142 are disposed layered on an outer side in the tire radial direction of the carcass layer 13.

The belt cover 143 is made by coating belt cover cords made from steel or an organic fiber material with a coating rubber and has a cord angle, as an absolute value, of 0 degrees or more and 10 degrees or less. Additionally, the belt cover 143 is, for example, a strip material formed by coating one or a plurality of belt cover cords with a coating rubber, where the strip material is formed by winding the strip material spirally on the outer circumferential surfaces of the cross belts 141 and 142 multiple times in the tire circumferential direction. Additionally, the belt cover 143 is disposed covering all the cross belts 141, 142.

The tread rubber 15 is disposed in the outer circumferences in the tire radial direction of the carcass layer 13 and the belt layer 14 and constitutes a tread portion of the tire. The pair of sidewall rubbers 16, 16 are disposed on an outer side in the tire width direction of the carcass layer 13 and constitute sidewall portions of left and right, respectively. The pair of rim cushion rubbers 17, 17 extend from an inner side in the tire radial direction of the bead cores 11, 11 of left and right and turned back portions of the carcass layer 13 toward the outer side in the tire width direction, and constitute rim fitting surfaces of the bead portions.

Tread Pattern

Figure 2:
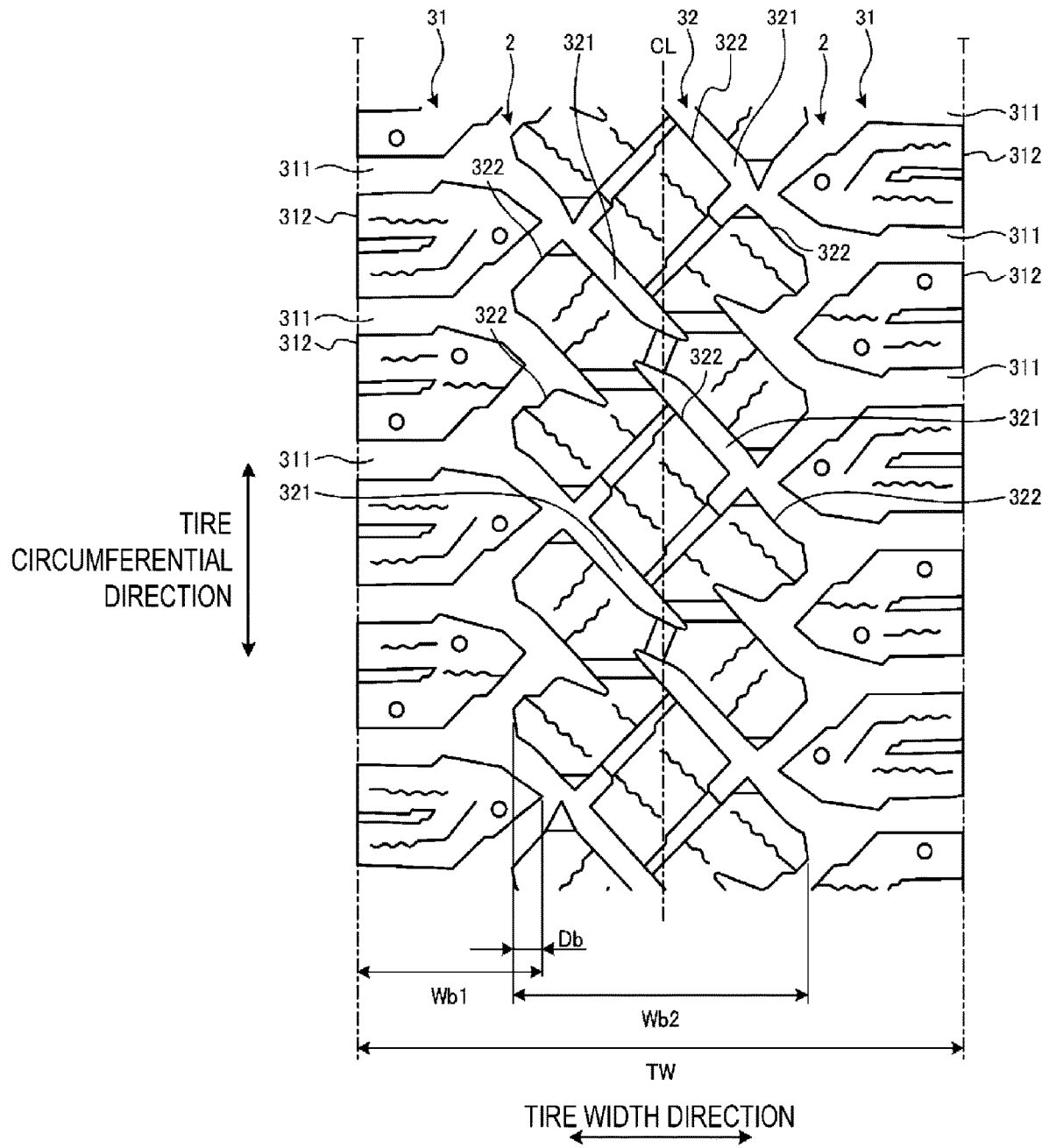
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread surface of an off-road tire. In the same drawing, "tire circumferential direction" refers to the direction about the tire rotation axis. Additionally, reference sign T denotes a tire ground contact edge, and dimension symbol TW denotes a tire ground contact width.

As illustrated in FIG. 2, the pneumatic tire 1 includes, in the tread surface, a pair of circumferential main grooves 2, and a pair of shoulder land portions 31 and a row of center land portion 32 that are defined by these circumferential main grooves 2.

The circumferential main groove 2 has a zigzag shape having an amplitude in the tire width direction. Further, the circumferential main groove 2 refers to a groove on which a wear indicator must be provided as specified by JATMA, and has a maximum groove width of 7.0 mm or more and a maximum groove depth of 8.0 mm or more.

The groove width is measured as a distance between groove walls opposed to each other in a groove opening portion when the tire is mounted on a specified rim, inflated to a specified internal pressure, and in an unloaded state. In a configuration in which the groove opening portion includes a notch portion or a chamfered portion, the groove width is measured with intersection points between an extension line of the tread contact surface and extension lines of the groove walls as measurement points, in a cross-sectional view parallel with the groove width direction and the groove depth direction.

The groove depth is measured as a distance from the tread contact surface to a groove bottom when the tire is mounted on a specified rim, inflated to a specified internal pressure, and in an unloaded state. Additionally, in a configuration in which a groove bottom includes partial recess/protrusion portions or a sipe, the groove depth is measured excluding the partial recess/protrusion portions or the sipe.

"Specified rim" refers to a "standard rim" defined by JATMA, a "Design Rim" defined by the Tire and Rim Association, Inc. (TRA), ora "Measuring Rim" defined by the European Tyre and Rim Technical Organisation (ETRTO). Additionally, "specified internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in the case of a tire for a passenger vehicle, specified internal pressure is an air pressure of 180 kPa, and specified load is 88% of the maximum load capacity at the specified internal pressure.

Additionally, in FIG. 2, a maximum ground contact width Wb1 of the shoulder land portion 31 is preferably in the range $0.50 \leq Wb1/TW \leq 0.80$, and more preferably in the range $0.55 \leq Wb1/TW \leq 0.70$, with respect to the tire ground contact width TW.

In addition, a maximum ground contact width Wb2 of the center land portion 32 is preferably in the range $0.30 \leq Wb2/TW \leq 0.60$, and more preferably in the range $0.405 \leq Wb2/TW \leq 0.50$, with respect to the tire ground contact width TW.

The ground contact widths of the land portions are each measured as a linear distance in the tire axial direction in a contact surface of the land portion and a flat plate, when the tire is mounted on a specified rim, inflated to a specified internal pressure, placed perpendicular to the flat plate in a static state, and subjected to a load corresponding to a specified load.

The tire ground contact width TW is measured as a linear distance in the tire axial direction of a contact surface of the tire and a flat plate when the tire is mounted on a specified rim, inflated to a specified internal pressure, placed perpendicular to the flat plate in a static state, and subjected to a load corresponding to a specified load.

A tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

Further, as illustrated in FIG. 2, the pair of shoulder land portions 31 and the center land portion 32 are arranged so as to overlap each other when viewed in the tire circumferential direction. Accordingly, the circumferential main groove 2 has the see-through-less structure when viewed in the tire circumferential direction.

Further, an overlap amount Db between the shoulder land portion 31 and the center land portion 32 has the relationship $0 \leq Db/TW \leq 0.10$ with respect to the tire ground contact width TW.

The overlap amount Db of the land portions 31, 32 is measured as a distance in the tire width direction of measurement points of the maximum ground contact widths Wb1, Wb2 of the land portions 31, 32.

Shoulder Land Portion

As illustrated in FIG. 2, the shoulder land portion 31 includes a plurality of shoulder lug grooves 311 and a plurality of shoulder blocks 312 defined by these shoulder lug grooves 311.

The shoulder lug groove 311 extends in the tire width direction and opens to the circumferential main groove 2; 2 at one end thereof and opens to the tire ground contact edge T at an other end thereof. Additionally, a plurality of the shoulder lug grooves 311 are arrayed at a predetermined interval in the tire circumferential direction. Moreover, the shoulder lug groove 311 has a groove width of 13 mm or more and a groove depth of 8.0 mm or more. Further, the groove depth of the shoulder lug groove 311 is in the range of 80% or more and 100% or less with respect to the groove depth of the circumferential main groove 2. Further, in the configuration of FIG. 2, the same number of shoulder lug grooves 311 as the number of zigzag-shaped pitches of the circumferential main groove 2 are arranged, and these shoulder lug grooves 311 are each open to maximum amplitude positions of the circumferential main groove 2; 2, to the outer side in the tire width direction.

The shoulder block 312 includes a protruding edge portion that protrudes toward the tire equatorial plane CL side along the zigzag shape of the circumferential main groove 2. Additionally, the plurality of shoulder blocks 312 are arranged at a predetermined interval in the tire circumferential direction to form a single block row. Further, in the configuration of FIG. 2, the same number of shoulder blocks 312 as the number of zigzag-shaped pitches of the circumferential main groove 2 are formed. Further, each of the shoulder blocks 312 includes a semi-closed lug groove (reference sign omitted in drawings) that opens to the tire ground contact edge T at one end and terminates in the shoulder block 312 at an other end, a plurality of sipes (reference sign omitted in drawings), and a pin hole for inserting a studless pin (reference sign omitted in drawings).

Center Land Portion

As illustrated in FIG. 2, the center land portion 32 includes a plurality of inclined main grooves 321, a plurality of lateral grooves or auxiliary grooves (reference sign omitted in the drawings), and a plurality of center blocks 322 defined by these grooves.

As illustrated in FIG. 2, the inclined main groove 321 inclines to the tire circumferential direction and extends therein, and intersects the tire equatorial plane CL. Further, the inclined main groove 321 opens to the circumferential main groove 2 at one end thereof and terminates in the center land portion 32 at an other end thereof. Further, the left and right inclined main grooves 321, 321 mutually incline in the same direction with respect to the tire circumferential direction and extend therein, and open to the left and right circumferential main grooves 2, 2. Moreover, the inclined main groove 321 has a groove width of 5.0 mm or more and a groove depth of 8.0 mm or more. In the configuration of FIG. 2, the inclined main groove 321 has the same maximum groove depth with respect to the circumferential main groove 2. Furthermore, the inclination angle (dimension symbol omitted in the drawings) of the inclined main groove 321 with respect to the tire equatorial plane CL is in the range of 25 degrees or more and 70 degrees or less.

The inclination angle of the inclined main groove 321 is measured as an angle between the groove center line of the inclined main groove 321 and the tire equatorial plane CL.

The center block 322 includes a protruding edge portion that protrudes toward the tire ground contact edge T side along the zigzag shape of the circumferential main groove 2. Additionally, the plurality of center blocks 322 are arranged at a predetermined interval in the tire circumferential direction. Further, in the configuration of FIG. 2, the same number of center blocks 322 as the number of zigzag-shaped pitches of the circumferential main groove 2 are arranged along the circumferential main groove 2 in the tire circumferential direction. Furthermore, each of the center blocks 322 includes a plurality of sipes (reference sign omitted in the drawings).

Protrusion Portion of Groove Bottom

Figure 3:
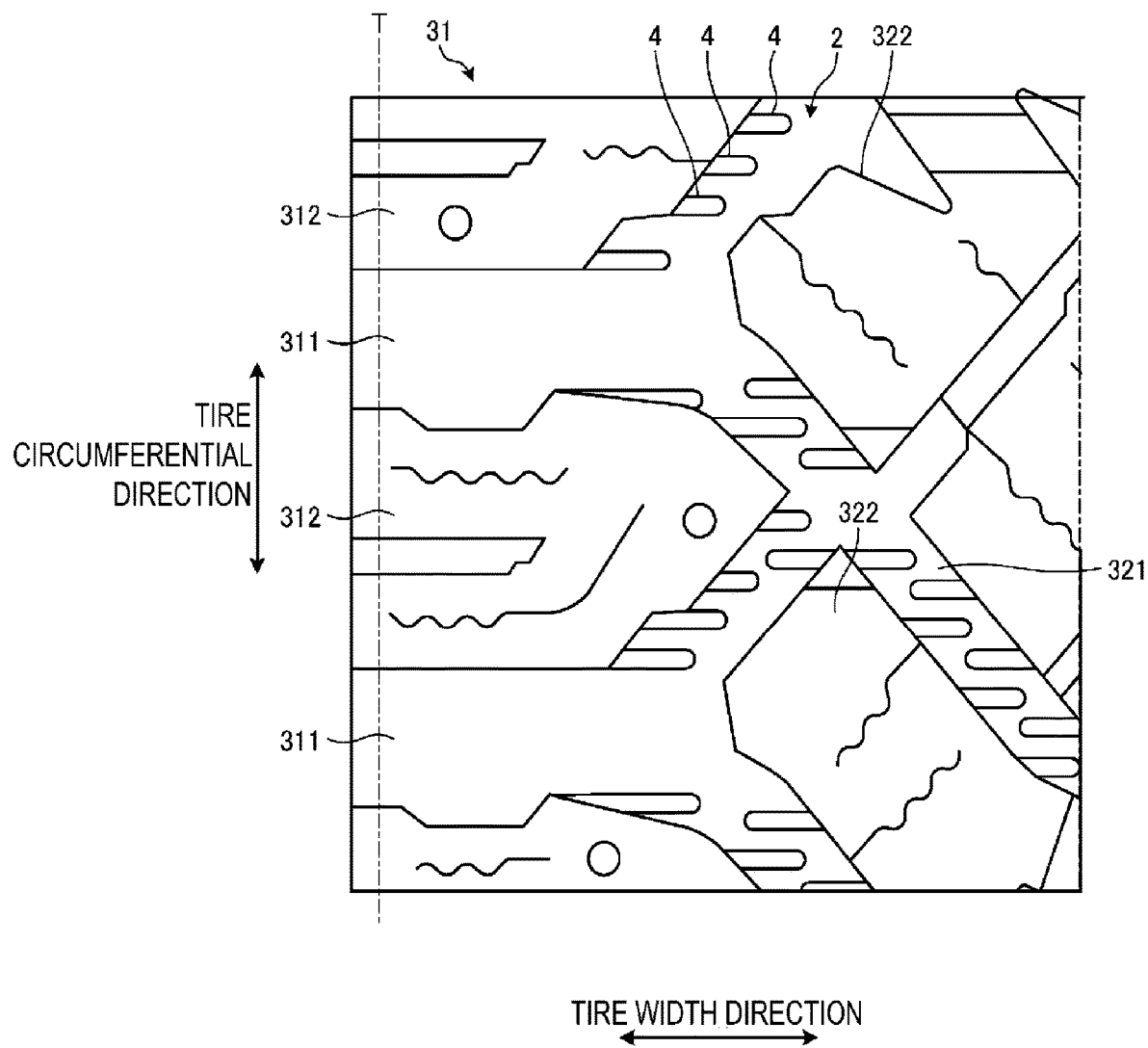
FIG. 3 is an enlarged view illustrating a groove bottom of a circumferential main groove and an inclined main groove illustrated in FIG. 2.
Figure 4:
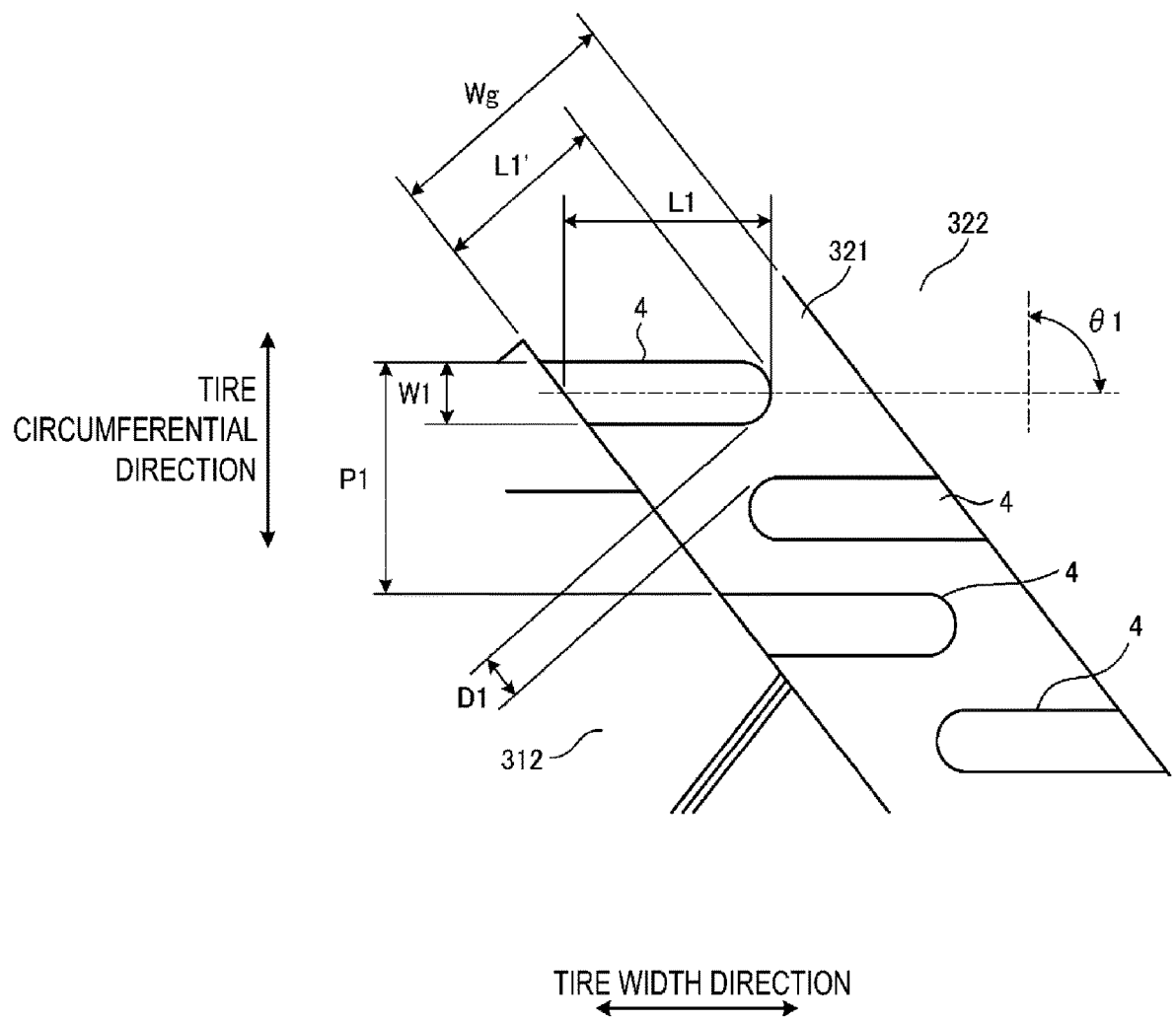
FIG. 4 is an enlarged view illustrating a protrusion portion of the groove bottom illustrated in FIG. 2.
Figure 5:
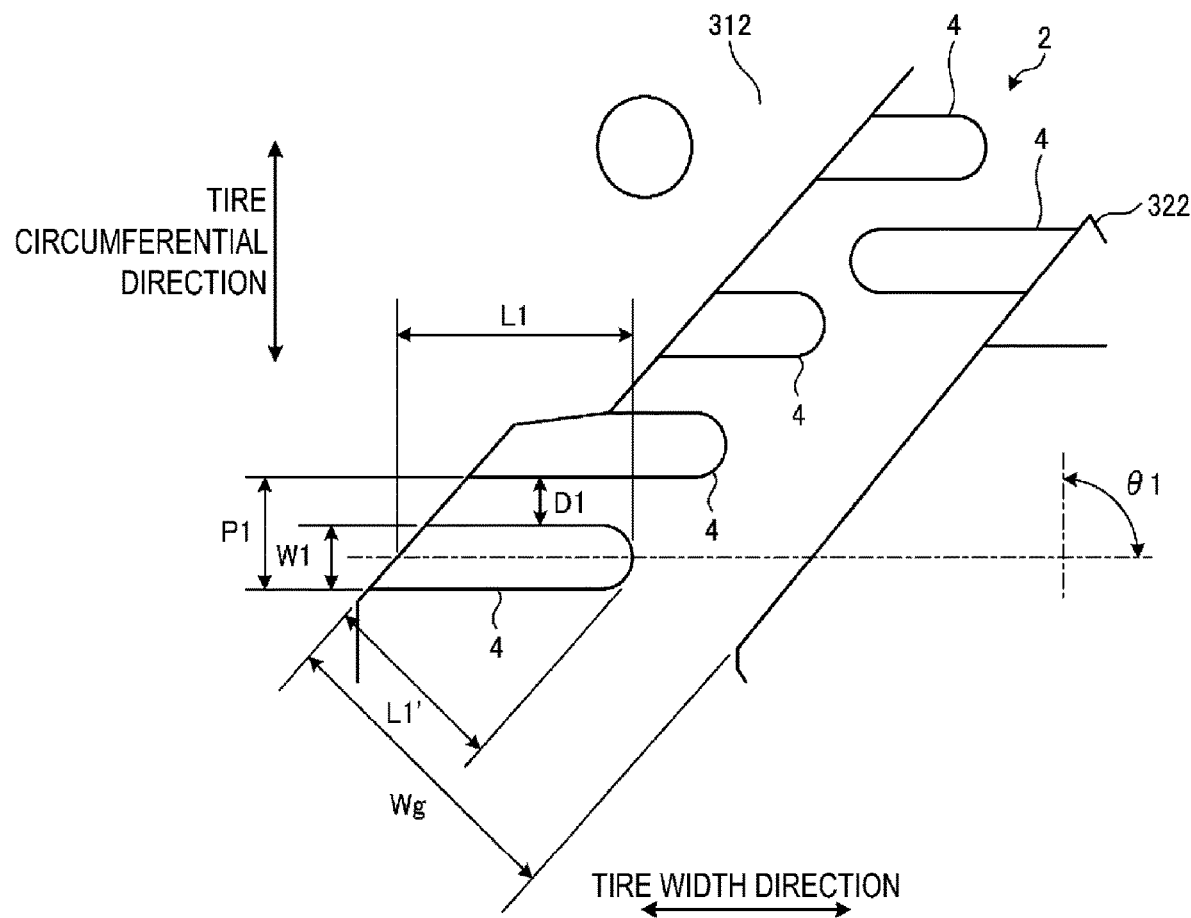
FIG. 5 is an enlarged view illustrating the protrusion portion of the groove bottom illustrated in FIG. 2.
Figure 6:
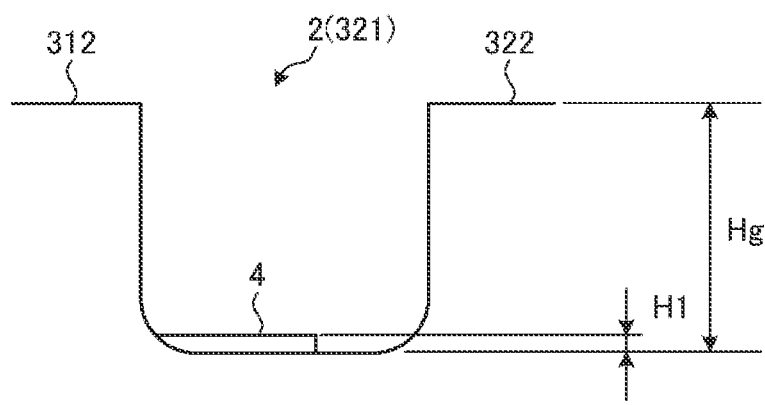
FIG. 6 is a cross-sectional view illustrating the protrusion portion illustrated in FIGS. 4 and 5.
Figure 7:
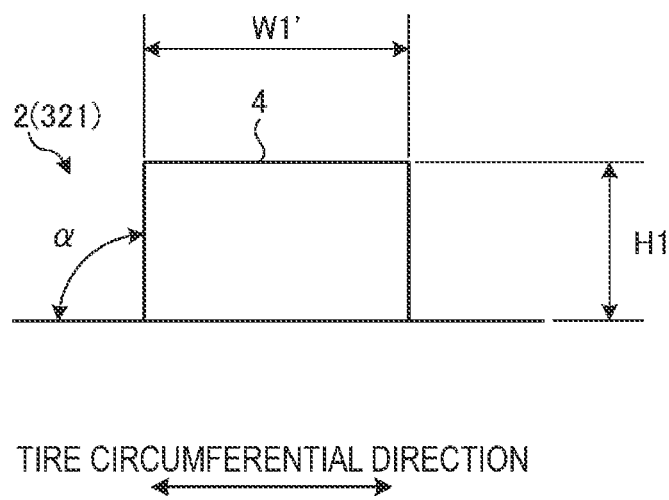
FIG. 7 is a cross-sectional view illustrating the protrusion portion illustrated in FIGS. 4 and 5.

FIG. 3 is an enlarged view illustrating groove bottoms of the circumferential main groove 2 and the inclined main groove 321 illustrated in FIG. 2. FIGS. 4 and 5 are enlarged views illustrating a protrusion portion 4 of the groove bottom illustrated in FIG. 3. In these figures, FIG. 4 illustrates the protrusion portion 4 of the groove bottom of the inclined main groove 321, and FIG. 5 illustrates the protrusion portion 4 of the groove bottom of the circumferential main groove 2. FIGS. 6 and 7 are cross-sectional views illustrating the protrusion portions 4 illustrated in FIGS. 4 and 5. In these figures, FIG. 6 illustrates a cross-sectional view in the tire width direction and the groove depth direction, and FIG. 7 illustrates a cross-sectional view in the tire circumferential direction and the groove depth direction.

In this pneumatic tire 1, main grooves (the circumferential main groove 2 and the inclined main groove 321) having a predetermined circumferential component, specifically, the main groove 2, 321 having an inclination angle (dimension symbol omitted in the drawings) of 25 degrees or more and 70 degrees or less with respect to the tire circumferential direction is provided with the plurality of protrusion portions 4 at the groove bottom thereof. In the configuration of FIG. 3, the circumferential main groove 2, the shoulder lug groove 311, and the inclined main groove 321 are the main grooves, and among these main grooves, the circumferential main groove 2 and the inclined main groove 321 include the protrusion portion 4. Hereinafter, these circumferential main groove 2 and inclined main groove 321 will be simply referred to as a main groove 2, 321. Note that the inclination angle of the circumferential main groove 2 having the zigzag shape is measured as the inclination angle of a linear portion of the zigzag shape.

The protrusion portion 4 has a rib-like structure, and protrudes from the groove bottom of the main groove 2; 321 and extends in the groove width direction. Further, the protrusion portion 4 is coupled to a groove wall of the main groove 2; 321 at, at least, one end thereof. Specifically, the protrusion portion 4 may be coupled to the groove wall of the main groove 2; 321 at one end and terminate in the main groove 2; 321 at an other end (see FIG. 3), and may transverse the groove bottom of the main groove 2; 321 to be coupled to the left and right groove walls facing each other (see FIG. 9 described later).

In the configuration described above, the rib-shaped protrusion portion 4 extending in the tire width direction is arranged at the groove bottom of the main groove 2; 321, so that when traveling on a mud road, tire off-road performance is improved by the traction action of the protrusion portion 4. Further, since the protrusion portion 4 is connected to the groove wall of the main groove 2; 321 at, at least, one end, the protrusion portion 4 is reinforced by the land portion 31, 32. In this way, occurrence of groove bottom cracks starting from the protrusion portion 4 is suppressed, and tire scratch resistance is improved. At the same time, since the land portion 31, 32 is reinforced by the protrusion portion 4, there is an advantage that tire wear resistance is improved.

Further, in FIGS. 4 and 5, an extension length L1 of the protrusion portion 4 in the tire width direction has the relationship $0.10 \leq W1/L1 \leq 0.40$, and preferably has the relationship $0.15 \leq W1/L1 \leq 0.30$, with respect to a maximum width W1 of the protrusion portion. Accordingly, the protrusion portion 4 has an elongated structure in the tire width direction.

By drawing a center line in the longitudinal direction of the protrusion portion 4 in a tread plan view, the maximum width W1 of the protrusion portion 4 is measured as a maximum value of the width of the protrusion portion 4 in the direction perpendicular with respect to the center line.

Further, in FIGS. 4 and 5, the maximum width W1 of the protrusion portion 4 has the relationship $0.10 \leq W1/P1 \leq 0.60$, and preferably has the relationship $0.15 \leq W1/P1 \leq 0.50$, with respect to a pitch length P1 of the protrusion portion 4 that is coupled to one groove wall of the main groove 2; 321.

The pitch length P1 of the protrusion portion 4 is measured as the pitch length of the plurality of protrusion portions 4 coupled to one groove wall of the main groove 2; 321 in the tire circumferential direction.

Further, in FIGS. 4 and 5, the maximum width W1 of the protrusion portion 4 is in the range $0.5 \text{ mm} \leq W1 \leq 5.0 \text{ mm}$, and is preferably in the range $1.0 \text{ mm} \leq W1 \leq 3.0 \text{ mm}$. Thus, the rigidity of the protrusion portion 4 is ensured.

Further, in FIGS. 4 and 5, an inclination angle θ of the protrusion portion 4 is in the range $30 \text{ degrees} \leq \theta 1 \leq 150 \text{ degrees}$, and preferably, in the range $60 \text{ degrees} \leq \theta 1 \leq 140 \text{ degrees}$, with respect to the tire circumferential direction.

The inclination angle θ of the protrusion portion 4 is measured as an angle formed between an imaginary straight line connecting both ends of the center line in the longitudinal direction of the protrusion portion 4 and the tire circumferential direction in a tread plan view.

Further, in FIGS. 4 and 5, in the configuration in which the protrusion portion 4 is coupled to the groove wall of the main groove 2; 321 at one end and terminates in the main groove 2; 321 at an other end, an extension length L1' of the protrusion portion 4 in the groove width direction of the main groove 2; 321 has the relationship $0.40 \leq L1'/Wg \leq 0.90$, and preferably has the relationship $0.50 \leq L1'/Wg \leq 0.80$, with respect to the groove width Wg of the main groove 2; 321 at a position where the protrusion portion 4 is arranged.

Further, in FIGS. 4 and 5, a distance D1 between adjacent protrusion portions 4, 4 has the relationship $0.10 \leq D1/Wg \leq 0.60$, and preferably has the relationship $0.20 \leq D1/Wg \leq 0.40$, with respect to the groove width Wg of the main groove 2; 321. The distance D1 between adjacent protrusion portions 4, 4 preferably has the relationship $1.00 \leq D1/W1$ with respect to the maximum width W1 of the protrusion portion 4.

Note that in the configurations of FIGS. 4 and 5, the protrusion portion 4 has a rectangular shape having an arcuate terminating end portion in a tread plan view. However, no such limitation is intended, and the protrusion portion 4 may have a rectangular shape having an angular terminating end portion, or may have a trapezoidal shape, a triangular shape, an elliptical shape, or other geometric shape (not illustrated). Further, the protrusion portion 4 may have an arc shape curved or bent in the longitudinal direction, an S-shape, a step shape, or a zigzag shape, and may have a tapered shape or a stepped shape having a width that becomes narrower toward the terminating end portion (not illustrated).

Further, in the configuration of FIG. 4, the protrusion portions 4 are arranged in a staggered manner by alternately extending from the left and right groove walls of the main groove 321. On the other hand, in the configuration of FIG. 5, the protrusion portions 4 are arranged biased to one groove wall of the main groove 2. In this way, the protrusion portion 4 may be arranged on any groove wall.

Further, in FIG. 6, a maximum height H1 of the protrusion portion 4 has the relationship $0.01 \leq H1/Hg \leq 0.20$, and preferably has the relationship $0.03 \leq H1/Hg \leq 0.10$, with respect to a groove depth Hg of the main groove 2; 321. Furthermore, the maximum height H1 of the protrusion portion 4 is preferably equal to or less than the maximum height of the wear indicator, specifically, in the range $H1 \leq 1.6 \text{ mm}$. In such a configuration, since the maximum height H1 of the protrusion portion 4 is set very low, the groove volume of the main groove 2; 321 is ensured. Therefore, the tire off-road performance is secured, and occurrence of groove bottom cracks starting from the protrusion portion 4 is suppressed.

The maximum height H1 of the protrusion portion 4 is measured as a protrusion height from the measurement point of the maximum groove depth of the main groove 2; 321 to a top portion of the protrusion portion 4 at the position where the protrusion portion 4 is arranged.

Further, in FIG. 7, a maximum width W1' of the protrusion portion 4 in the tire circumferential direction has the relationship $2.00 \leq W1'/H1 \leq 10.0$, and preferably has the relationship $3.00 \leq W1'/H1 \leq 8.00$, with respect to the maximum height H1 of the protrusion portion 4. Thus, the rigidity of the protrusion portion 4 is ensured.

Further, in FIG. 7, a rising angle α of a side surface of the protrusion portion 4 on the tire circumferential direction side is in the range $90 \text{ degrees} \leq \alpha \leq 110 \text{ degrees}$, and is preferably in the range $90 \text{ degrees} \leq \alpha \leq 100 \text{ degrees}$. In this way, the edge component of the protrusion portion 4 is ensured.

The rising angle α of the protrusion portion 4 is measured as the maximum value of an angle formed between the groove bottom of the main groove 2; 321 and the side surface of the protrusion portion 4 on the tire circumferential direction side.

MODIFIED EXAMPLES

FIGS. 8 to 12 are explanatory diagrams illustrating modified examples of the protrusion portion illustrated in FIG. 3.

In the configuration of FIG. 4, the inclination angle θ1 of the protrusion portion 4 in the longitudinal direction is approximately 90 degrees, and the protrusion portion 4 extends in a direction perpendicular to the tire circumferential direction. Specifically, the inclination angle θ 1 of the protrusion portion 4 is in the range of 80 degrees or more and 100 degrees or less. In such a configuration, the circumferential edge component of the protrusion portion 4 is maximized, and the effect of improving the traction characteristics by the protrusion portion 4 are enhanced, which is preferable.

Figure 8:
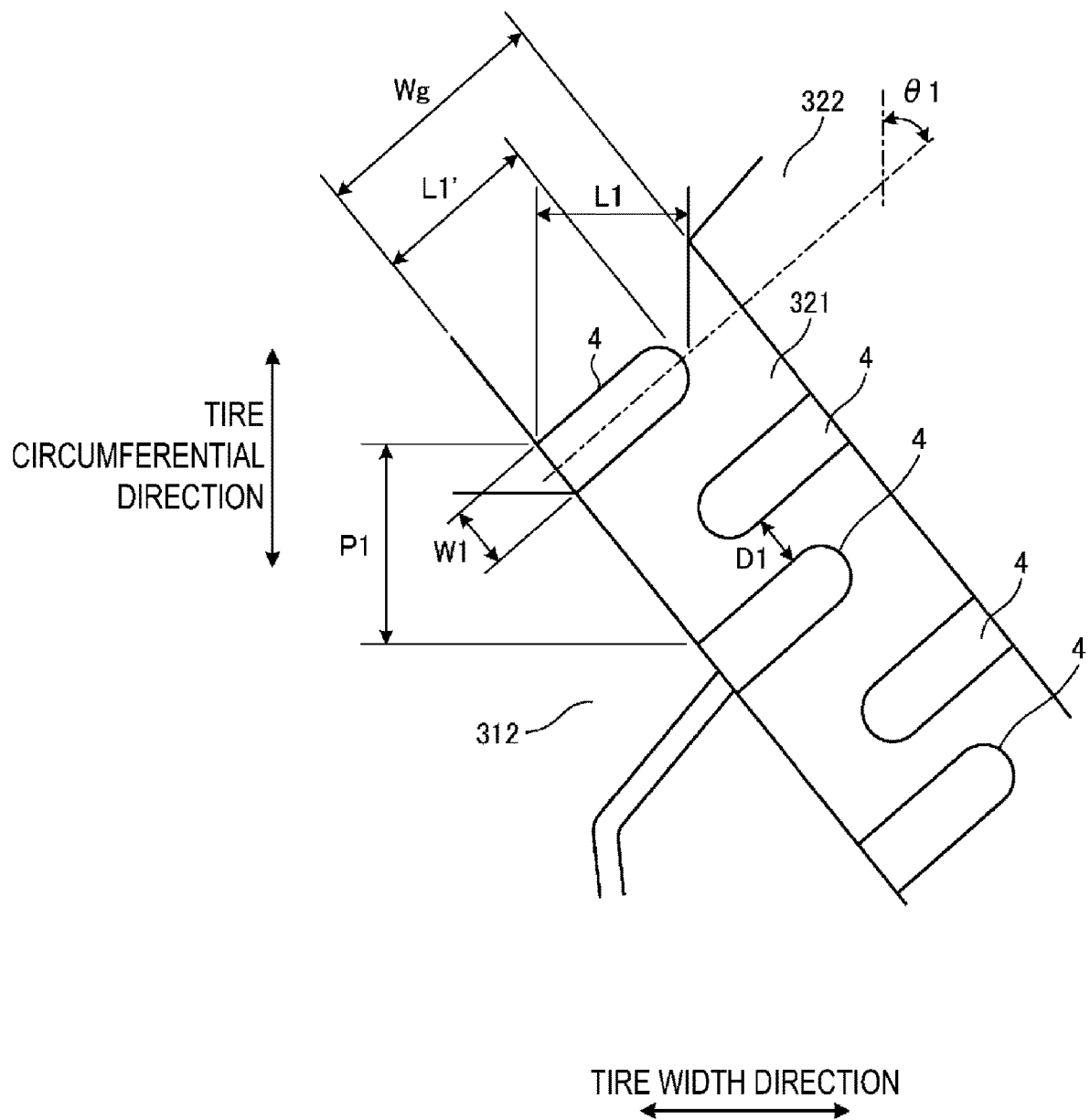
FIG. 8 is an explanatory diagram illustrating a modified example of the protrusion portion illustrated in FIG. 3.

On the other hand, in a configuration of FIG. 8, the protrusion portion 4 extends in a direction perpendicular to the groove length direction of the main groove 321. Specifically, the inclination angle (dimension symbol omitted in the drawings) of the protrusion portion 4 with respect to the groove length direction of the main groove 321 is in the range of 80 degrees or more and 100 degrees or less. In such a configuration, the protrusion portion 4 extends substantially perpendicular to the groove wall of the main groove 321, so that the effect of improving the traction characteristics by the protrusion portion 4 are enhanced.

Further, in the configuration of FIG. 4, the protrusion portion 4 terminates inside the main groove 2; 321 and thus does not traverse the main groove 2; 321. Specifically, a distance L1' from the terminating end portion of the protrusion portion 4 to the measurement point of the groove width Wg of the main groove 2; 321 has the relationship $0.10 \le L1'/Wg$ with respect to the groove width Wg of the main groove 2; 321. In such a configuration, the groove volume of the main groove 2; 321 is ensured, so that the traction characteristics are ensured, which is preferable.

Figure 9:
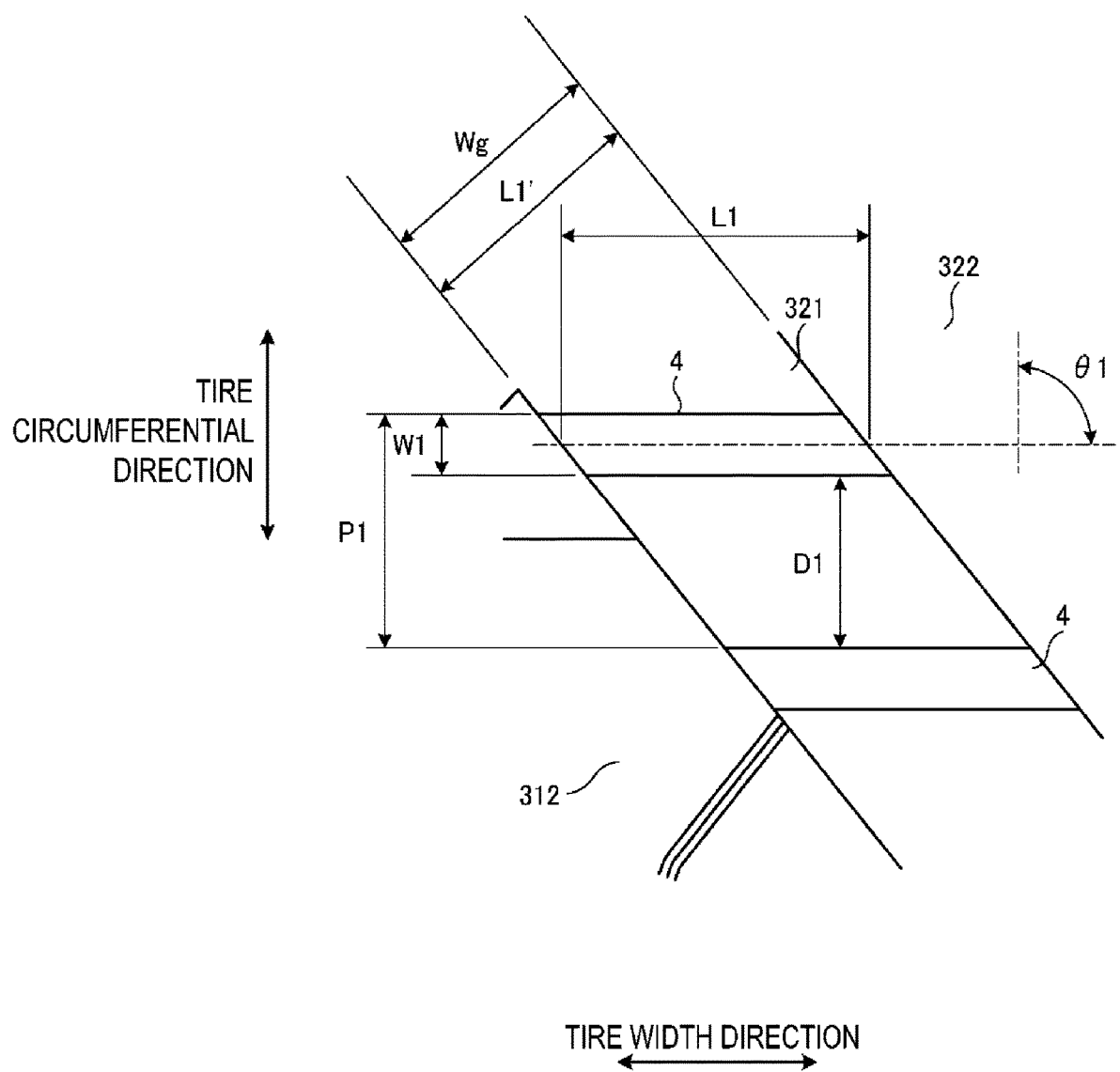
FIG. 9 is an explanatory diagram illustrating a modified example of the protrusion portion illustrated in FIG. 3.

On the other hand, in a configuration of FIG. 9, the protrusion portion 4 transverses the groove bottom of the main groove 2; 321 and is coupled to the left and right groove walls facing each other. In such a configuration, the edge component of the protrusion portion 4 is maximized, and the effect of improving the traction characteristics by the protrusion portion 4 are enhanced.

Figure 10:
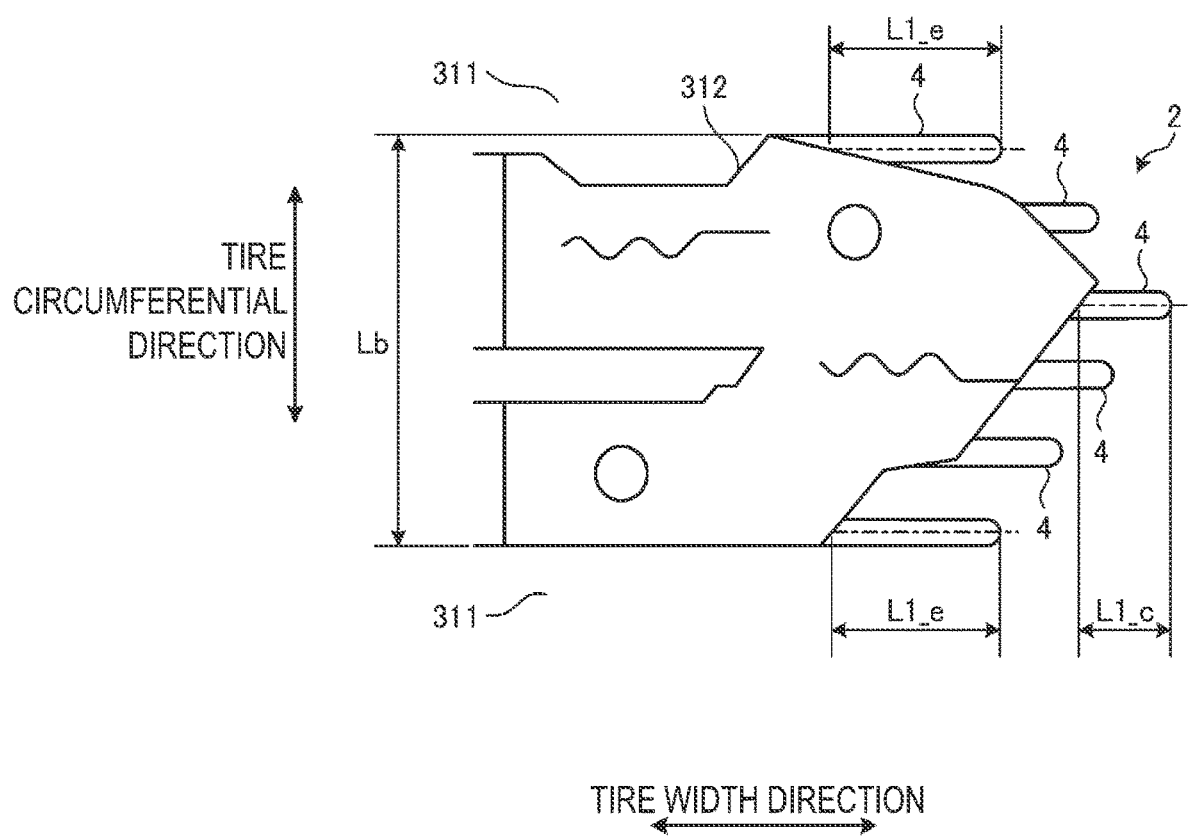
FIG. 10 is an explanatory diagram illustrating a modified example of the protrusion portion illustrated in FIG. 3.

Further, as illustrated in FIGS. 3 and 10, an extension length L1_e of the protrusion portion 4 arranged at the circumferential end portion of the shoulder block 312 is longer than an extension length L1_c of the protrusion portion 4 arranged in the circumferential central region, and specifically, it is preferable to have the relationship $L1\_c/L1\_e \le 0.80$, and more preferably, the relationship $L1\_c/L1\_e \le 0.50$. The lower limit of the ratio L1_c/L1_e is not particularly limited, but is subject to restrictions by other conditions. In such a configuration, the protrusion portion 4 arranged at the circumferential end portion of the shoulder block 312 has a long structure, so that the rigidity of the shoulder block 312 is effectively increased.

The circumferential central region of the shoulder block 312 is defined as a central region obtained by dividing a maximum circumferential length Lb of the shoulder block 312 into three equal portions.

Figure 11:
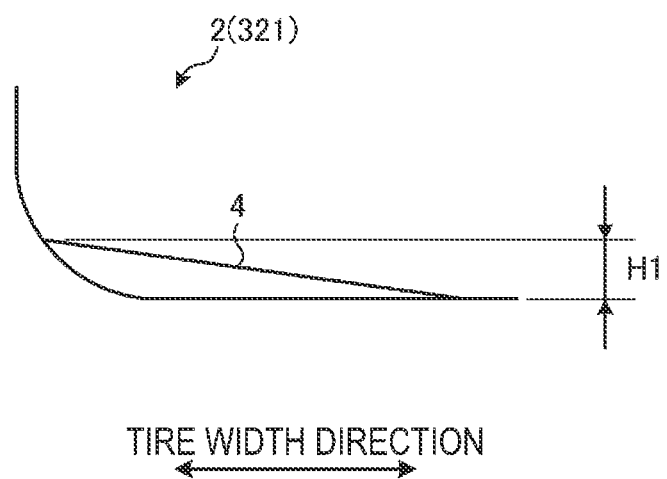
FIG. 11 is an explanatory diagram illustrating a modified example of the protrusion portion illustrated in FIG. 3.

In the configuration of FIG. 6, the protrusion portion 4 has a constant height (maximum height H1). However, no such limitation is intended, and as illustrated in FIG. 11, the height of the protrusion portion 4 may gradually decrease from the groove wall of the main groove 2; 321 toward the terminating end portion. As a result, the volume of the main groove 2; 321 is ensured, and mud drainage during rolling of the tire is ensured.

Figure 12:
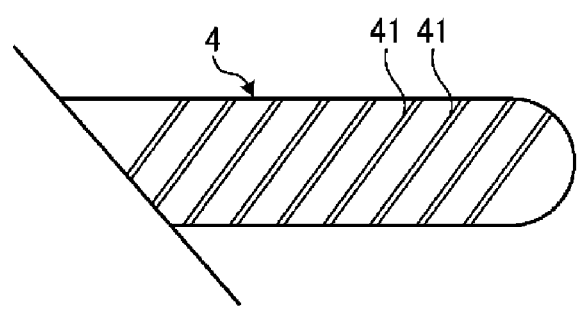
FIG. 12 is an explanatory diagram illustrating a modified example of the protrusion portion illustrated in FIG. 3.

Further, as illustrated in FIG. 12, surface treatment 41 may be applied to the top surface of the protrusion portion 4. As the surface treatment 41, for example, a plurality of narrow shallow grooves having a width of 0.5 mm or less and a depth of 0.3 mm or less may be formed. As a result, mud drainage is improved.

Effect

As described above, the pneumatic tire 1 includes a plurality of main grooves (in FIG. 2, the circumferential main groove 2 and the inclined main groove 321), and the land portions 31, 32 defined by the main groove 2; 321 (see FIG. 2). Further, the main groove 2; 321 includes the rib-shaped protrusion portion 4 protruding from the groove bottom of the main groove 2; 321 and extending in the tire width direction, and coupled to the groove wall of the main groove 2; 321 at, at least, one end thereof (see FIG. 3). Further, the maximum height H1 of the protrusion portion 4 has the relationship $0.01 \le H1/Hg \le 0.20$ with respect to the groove depth Hg of the main groove 2; 321 (see FIG. 6).

In such a configuration, (1) since the rib-shaped protrusion portion 4 extending in the tire width direction is arranged at the groove bottom of the main groove 2; 321, there is an advantage that tire off-road performance is improved by the traction action of the protrusion portion 4 when traveling on a mud road. Further, (2) since the protrusion portion 4 is coupled to the groove wall of the main groove 2; 321 at, at least, one end, the protrusion portion 4 is reinforced by the land portion 31, 32. In this way, there is an advantage that occurrence of groove bottom cracks starting from the protrusion portion 4 is suppressed, and tire scratch resistance is improved. At the same time, (3) since the land portion 31, 32 is reinforced by the protrusion portion 4, there is an advantage that tire wear resistance is improved. Further, (4) the maximum height H1 of the protrusion portion 4 is set very low, so that the groove volume of the main groove 2; 321 is ensured. In this way, there is an advantage that mud drainage during rolling of the tire is ensured and tire off-road performance is ensured, and also there is an advantage that occurrence of the groove bottom cracks starting from the protrusion portion 4 is suppressed.

Further, in this pneumatic tire, the maximum height H1 of the protrusion portion (see FIG. 6) is in the range $H1 \le 1.6$ mm. In this way, there is an advantage that the groove volume of the main groove 2; 321 is ensured, and also there is an advantage that the effect of the protrusion portion 4 with respect to the effective groove depth can be reduced.

Further, in this pneumatic tire, the extension length L1 of the protrusion portion 4 in the tire width direction has the relationship $0.10 \le W1/L \le 0.40$ with respect to the maximum width W1 of the protrusion portion 4 (see FIG. 4). In this way, there is an advantage that the aspect ratio of the protrusion portion 4 is made appropriate.

Further, in this pneumatic tire 1, the maximum width W1 of the protrusion portion 4 has the relationship $0.10 \le W1/P1 \le 0.60$ with respect to the pitch length P1 of the protrusion portion 4 at one groove wall to which the protrusion portion 4 is coupled (see FIG. 4). Due to the above lower limit, there is an advantage that the maximum width W1 of the protrusion portion 4 with respect to the pitch length P1 is properly set, and that the effect of improving the traction characteristics by the protrusion portion 4 is ensured. The upper limit described above has the advantage of ensuring the arrangement interval of the protrusion portions 4, and ensuring the groove volume of the main groove 2; 321.

Further, in this pneumatic tire 1, the inclination angle θ of the protrusion portion 4 with respect to the tire circumferential direction is in the range $30 \text{ degrees} \le \theta1 \le 150 \text{ degrees}$ (see FIG. 4). In this way, there is an advantage that the edge component of the protrusion portion 4 with respect to the tire circumferential direction is ensured, and the effect of improving the traction characteristics by the protrusion portion 4 is ensured.

Further, in this pneumatic tire 1, the protrusion portion 4 is coupled to the groove wall of the main groove 2; 321 at one end, and terminates in the main groove 2; 321 at the other end. Also, in a tread plan view, the extension length L1' of the protrusion portion 4 in the groove width direction of the main groove 2; 321 has the relationship 0.40≤L1'/Wg≤0.90 with respect to the groove width Wg of the main groove 2; 321 at the position where the protrusion portion 4 is arranged (see FIG. 4). The lower limit described above has the advantage of ensuring the extension length L1' of the protrusion portion 4, and ensuring the effect of improving the traction characteristics by the protrusion portion 4. The upper limit described above has the advantage of ensuring the groove volume of the main groove 2; 321.

Further, in this pneumatic tire 1, the distance D1 between adjacent protrusion portions 4, 4 has the relationship 0.10≤D1/Wg≤0.60 with respect to the groove width Wg of the main groove 2; 321 (see FIG. 4). The lower limit described above has the advantage of ensuring the arrangement interval of the protrusion portions 4, and ensuring the groove volume of the main groove 2; 321. The upper limit described above has the advantage of ensuring disposal density of the protrusion portion 4, and ensuring the effect of improving the traction characteristics by the protrusion portion 4.

Further, in this pneumatic tire 1, the distance D1 of adjacent protrusion portions 4, 4 has the relationship 1.00≤D1/W1 with respect to the maximum width W1 of the protrusion portion 4 (see FIG. 4). In this way, there is an advantage that the arrangement interval of the protrusion portions 4 is ensured, and the groove volume of the main groove 2; 321 is ensured.

Further, in this pneumatic tire 1, the maximum width W1' of the protrusion portion 4 in the tire circumferential direction has the relationship 2.00≤W1'/H1 with respect to the maximum height H1 of the protrusion portion 4 (see FIG. 7). In this way, there is an advantage that the rigidity of the protrusion portion 4 is ensured, and occurrence of groove bottom cracks starting from the protrusion portion 4 is suppressed.

Further, in this pneumatic tire 1, the rising angle α of the side surface of the protrusion portion 4 on the tire circumferential direction side is in the range 90 degrees≤α≤110 degrees (see FIG. 7). In this way, there is an advantage that the edge component of the protrusion portion 4 is ensured, and the effect of improving the traction characteristics by the protrusion portion 4 is ensured.

Furthermore, in this pneumatic tire 1, the inclination angle (dimension symbol omitted in the drawings) of the main groove 2; 321 with respect to the tire circumferential direction is in the range of 25 degrees or more and 70 degrees or less. The lower limit described above has the advantage of ensuring the edge component of the main groove 2; 321 in the circumferential direction to ensure the traction characteristics of the tire. The lower limit described above has the advantage of ensuring the mud drainage of the main groove 2; 321 to ensure the tire off-road performance.

Furthermore, in this pneumatic tire 1, the land portion 31 includes the plurality of blocks 312 that include the plurality of protrusion portions 4 (see FIG. 3). Further, the extension length L1_e of the protrusion portion 4 arranged at the circumferential end portion of the block 312 is longer than the extension length L1_c of the protrusion portion 4 arranged in the circumferential central region of the block 312 (see FIG. 10). In such a configuration, the protrusion portion 4 arranged at the circumferential end portion of the block 312 has a long structure, so that there is an advantage that the rigidity of the protrusion portion 4 is ensured, and occurrence of groove bottom cracks starting from the protrusion portion 4 is suppressed.

Further, in this pneumatic tire 1, the height of the protrusion portion 4 gradually decreases from the groove wall of the main groove 2; 321 toward the terminating end portion of the protrusion portion 4 (see FIG. 11). Accordingly, there is an advantage that the groove volume of the main groove 2, 321 is ensured.

EXAMPLES

FIG. 13 is a table showing the results of performance tests of pneumatic tires according to embodiments of the technology.

In the performance tests, (1) off-road performance, (2) wear resistance performance, and (3) scratch resistance performance were evaluated for a plurality of kinds of test tires. Further, test tires having a tire size of LT265/70R17 121Q were mounted on rims having a rim size of 17×8J, and an internal pressure of 350 kPa and a load specified by JATMA were applied to the test tires. Further, the test tires were mounted on all wheels of an LT pickup car serving as a test vehicle.

(1) In the evaluation of off-road performance, the test vehicle was driven on a predetermined mud road, and a test driver performed a sensory evaluation of traction characteristics. The evaluation was conducted using index values, with Conventional Example being assigned as the reference (100), with larger values being more preferable.

(2) In the evaluation of wear resistance performance, after the test vehicle had been driven for 8000 km on a predetermined off-road course, the degree of wear was observed and expressed as index values and evaluated. The evaluation was conducted using index values, with Conventional Example being assigned as the reference (100), with larger values being more preferable.

(3) In the evaluation of scratch resistance performance, the number of groove bottom cracks after the test vehicle had been driven on a predetermined rubble field was counted. The results are expressed as index values and evaluated with Conventional Example being assigned as the reference (100). In this evaluation, larger values are more preferable.

The test tires of Examples have the configuration of FIGS. 1 to 3, and the main groove 2; 321 has the plurality of protrusion portions 4 at the groove bottom. Further, the groove width of the circumferential main groove 2 is 14.0 mm, and the groove depth is 14.6 mm. Furthermore, the groove width of the inclined main groove 321 is 10.4 mm, and the groove depth is 14.6 mm. Furthermore, the groove width of other lateral groove and auxiliary groove (reference sign omitted in the drawings) is 4.0 mm.

In the test tire of the Comparative Example, the protrusion portion 4 is arranged spaced apart from the groove wall of the main groove 2; 321 and the maximum height of the protrusion portion 4 is set to be large, in the test tire of Example 1.

As can be seen from the test results, the test tires of Examples can provide improved tire scratch resistance performance while enhancing tire off-road performance.

The invention claimed is:

1. A pneumatic tire comprising:
a plurality of main grooves; and
a land portion defined by the main grooves;
each of the main grooves comprising a protrusion portion that protrudes from a groove bottom of the main groove and extends in a tire width direction, and that is coupled to a groove wall of the main groove at at least one end, the protrusion portion having a rib shape, a maximum height H1 of the protrusion portion having a relationship $0.01 \leq H1/Hg \leq 0.20$ with respect to a groove depth Hg of the main groove, an extension length L1 of the protrusion portion in the tire width direction having a relationship $0.10 \leq W1/L1 \leq 0.40$ with respect to a maximum width W1 of the protrusion portion, the protrusion portion being coupled to the groove wall of the main groove at one end and terminating in the main groove at an other end, and in a tread plan view, an extension length L1' of the protrusion portion in a groove width direction of the main groove having a relationship $0.50 \leq L1'/Wg \leq 0.90$ with respect to a groove width Wg of the main groove at a position where the protrusion portion is arranged.

2. The pneumatic tire according to claim 1, wherein the maximum height H1 of the protrusion portion is in a range $H1 \leq 1.6$ mm.

3. The pneumatic tire according to claim 1, wherein the protrusion portion comprises a plurality of protrusion portions and a maximum width W1 of each of the protrusion portions has a relationship $0.10 \leq W1/P1 \leq 0.60$ with respect to a pitch length P1 of the protrusion portions at the groove wall to which the protrusion portions are coupled.

4. The pneumatic tire according to claim 1, wherein an inclination angle $\theta$ of the protrusion portion with respect to a tire circumferential direction is in a range 30 degrees $\leq \theta 1 \leq 150$ degrees.

5. The pneumatic tire according to claim 1, wherein the protrusion portion comprises a plurality of protrusion portions and a distance D1 between adjacent protrusion portions has a relationship $0.10 \leq D1/Wg \leq 0.60$ with respect to a groove width Wg of the main groove.

6. The pneumatic tire according to claim 1, wherein the protrusion portion comprises a plurality of protrusion portions and a distance D1 of adjacent protrusion portions has a relationship $1.00 \leq D1/W1$ with respect to a maximum width W1 of an individual one of the protrusion portions.

7. The pneumatic tire according to claim 1, wherein a maximum width W1' of the protrusion portion in a tire circumferential direction has a relationship $2.00 \leq W1'/H1$ with respect to the maximum height H1 of the protrusion portion.

8. The pneumatic tire according to claim 1, wherein a rising angle $\alpha$ of a side surface of the protrusion portion on a tire circumferential direction side is in a range 90 degrees $\leq \alpha \leq 110$ degrees.

9. The pneumatic tire according to claim 1, wherein an inclination angle of the main groove with respect to a tire circumferential direction is in a range of 25 degrees or more and 70 degrees or less.

10. The pneumatic tire according to claim 1, wherein the land portion comprises a plurality of blocks including a plurality of the protrusion portion, and an extension length L1_e of a protrusion portion arranged at a circumferential end portion of the block is longer than an extension length L1_c of a protrusion portion arranged in a circumferential central region of the blocks.

11. The pneumatic tire according to claim 1, wherein the protrusion portion is coupled to the groove wall of the main groove at one end and terminates in the main groove at an other end, and a height of the protrusion portion gradually decreases from the groove wall of the main groove toward a terminating end portion of the protrusion portion.

12. A pneumatic tire comprising:

a plurality of main grooves; and a land portion defined by the main grooves;

each of the main grooves comprising a protrusion portions that protrude from a groove bottom of the main groove and extend in a tire width direction, and that are coupled to a groove wall of the main groove at at least one end, the protrusion portions having a rib shape, a maximum height H1 of each of the protrusion portions having a relationship $0.01 \leq H1/Hg \leq 0.20$ with respect to a groove depth Hg of the main groove, a maximum width W1 of the protrusion portions having a relationship $0.10 \leq W1/P1 \leq 0.60$ with respect to a pitch length P1 of the protrusion portions at the groove wall to which the protrusion portions are coupled, the protrusion portions being coupled to the groove wall of the main groove at one end and terminating in the main groove at an other end, and an inclination angle $\theta$ of the protrusion portion with respect to a tire circumferential direction being in a range 65 degrees $\leq \theta 1 \leq 115$ degrees.

13. A pneumatic tire comprising:

a plurality of main grooves; and a land portion defined by the main grooves;

each of the main grooves comprising protrusion portions that protrude from a groove bottom of the main groove and extend in a tire width direction, and that are coupled to a groove wall of the main groove at at least one end, the protrusion portions having a rib shape, a maximum height H1 of the protrusion portions having a relationship $0.01 \leq H1/Hg \leq 0.09$ with respect to a groove depth Hg of the main groove, the maximum height H1 of the protrusion portions being in a range $H1 \leq 1.6$ mm, a distance D1 of adjacent protrusion portions having a relationship $1.00 \leq D1/W1$ with respect to a maximum width W1 of the protrusion portions, and a distance D1 between adjacent protrusion portions having a relationship $0.10 \leq D1/Wg \leq 0.60$ with respect to a groove width Wg of the main groove.

* * * * *